United States Patent
Sander et al.

(10) Patent No.: US 10,871,243 B2
(45) Date of Patent: Dec. 22, 2020

(54) THROTTLE BODY WITH A PLURALITY OF CHANNELS EXTENDING THREE-DIMENSIONAL SPIRAL-SHAPED

(71) Applicant: SAMSON AKTIENGESELLSCHAFT, Frankfurt (DE)

(72) Inventors: Andreas Sander, Weinheim (DE); Domagoj Vnucec, Ilvesheim (DE); Nadine Wetzstein, Frankfurt am Main (DE)

(73) Assignee: SAMSON AKTIENGESELLSCHAFT, Frankfurt (DE)

( * ) Notice: Subject to any disclaimer, the term of this patent is extended or adjusted under 35 U.S.C. 154(b) by 272 days.

(21) Appl. No.: 15/570,618

(22) PCT Filed: Apr. 27, 2016

(86) PCT No.: PCT/EP2016/059440
§ 371 (c)(1),
(2) Date: Oct. 30, 2017

(87) PCT Pub. No.: WO2016/174107
PCT Pub. Date: Nov. 3, 2016

(65) Prior Publication Data
US 2018/0283580 A1    Oct. 4, 2018

(30) Foreign Application Priority Data

Apr. 30, 2015 (DE) .................. 10 2015 005 611

(51) Int. Cl.
*F16K 47/06* (2006.01)
*F16K 47/12* (2006.01)
*F16L 55/027* (2006.01)

(52) U.S. Cl.
CPC .............. *F16K 47/06* (2013.01); *F16K 47/12* (2013.01); *F16L 55/02772* (2013.01)

(58) Field of Classification Search
CPC ..... F16K 47/06; F16K 47/12; F16L 55/02772
(Continued)

(56) References Cited

U.S. PATENT DOCUMENTS 3,597,820 A * 8/1971 Schenck, Jr. ........... F16K 5/025
29/890.124
3,703,910 A * 11/1972 Smith ..................... F16K 5/162
137/375

(Continued)

FOREIGN PATENT DOCUMENTS

DE        2457560 A1    6/1975
DE       10332262 A1    2/2004
(Continued)

OTHER PUBLICATIONS

German Search Report dated Jul. 4, 2016 for PCT/EP2016-059440.

*Primary Examiner* — John Bastianelli
(74) *Attorney, Agent, or Firm* — Schiff Hardin LLP

(57) ABSTRACT

In a throttle body for reducing the fluid pressure, particularly at a control valve, preferably for arranging in a process fluid line, of a process plant, such as a chemical plant, particularly a petrochemical plant, a power plant, a brewery or the like, with a plurality of channels extending from an upstream channel inlet to a downstream channel outlet, it is foreseen that an at least section-wise curved course of at least one of the plurality of channels between the channel inlet and the channel outlet deviates from a two-dimensional extension.

15 Claims, 4 Drawing Sheets

(58) Field of Classification Search
USPC .............................. 251/126–127; 138/40–46
See application file for complete search history.

(56) References Cited

U.S. PATENT DOCUMENTS

| | | | | |
|---|---|---|---|---|
| 3,780,767 | A * | 12/1973 | Borg ........................ | F16K 47/08 |
| | | | | 137/625.3 |
| 3,941,350 | A * | 3/1976 | Kluczynski ............. | F16K 47/08 |
| | | | | 251/127 |
| 6,644,620 | B2 * | 11/2003 | Johnson ................. | B67D 3/045 |
| | | | | 222/504 |
| 8,678,348 | B1 * | 3/2014 | Cassel ....................... | F16K 1/04 |
| | | | | 251/223 |
| 2003/0188787 | A1 * | 10/2003 | Steinke ................... | F16K 47/08 |
| | | | | 137/625.33 |
| 2005/0016792 | A1 | 1/2005 | Graefenstein | |
| 2009/0183790 | A1 * | 7/2009 | Moore ................. | B22F 3/1055 |
| | | | | 137/597 |
| 2013/0291980 | A1 | 11/2013 | Harman | |

FOREIGN PATENT DOCUMENTS

| | | |
|---|---|---|
| DE | 69914643 T2 | 10/2004 |
| DE | 10 2006 045 650 A1 | 4/2008 |
| EP | 1456571 A2 | 9/2004 |
| EP | 2716953 A2 | 4/2014 |
| GB | 1486 440 A | 9/1977 |
| KR | 20140136099 A | 11/2014 |
| WO | WO 2014/178723 A1 * | 11/2014 |

* cited by examiner

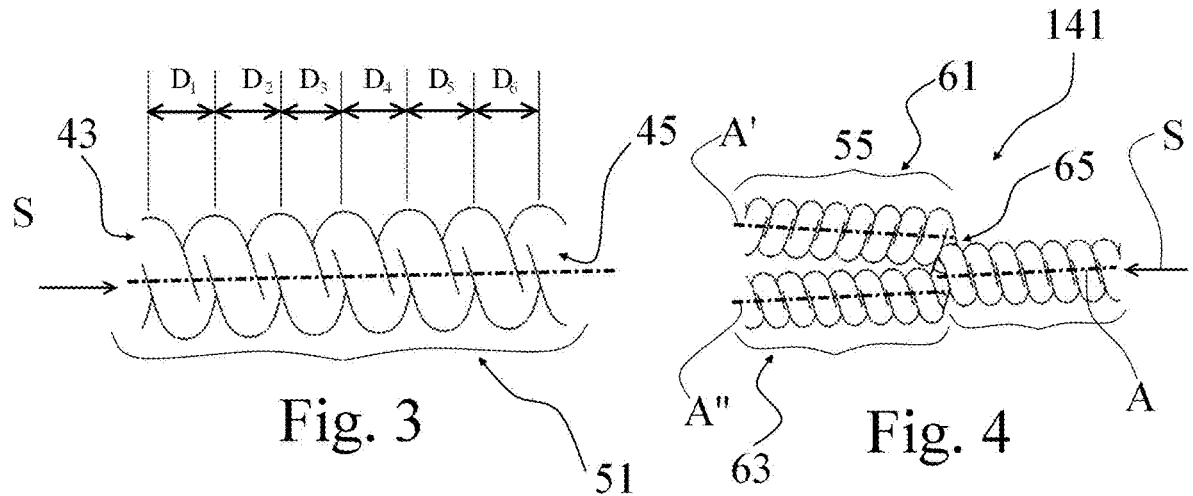
Fig. 3
Fig. 4
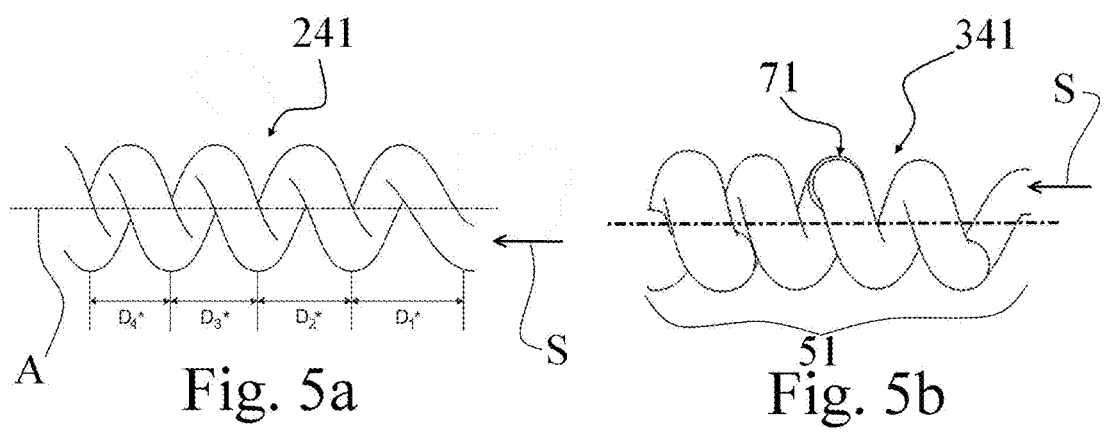
Fig. 5a
Fig. 5b
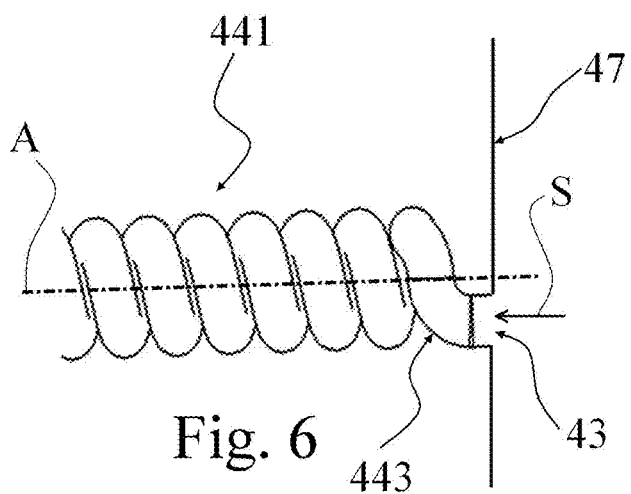
Fig. 6

THROTTLE BODY WITH A PLURALITY OF CHANNELS EXTENDING THREE-DIMENSIONAL SPIRAL-SHAPED

CROSS REFERENCE TO RELATED APPLICATIONS

This patent application is a national stage application filed under 35 U.S.C. 371 based on PCT International Application No. PCT/EP2016/059440, filed Apr. 27, 2016, which claims the benefit of priority of and to German Patent Application No. 10 2015 005 611.5, filed Apr. 30, 2015, each of which is incorporated herein by reference in its entirety.

BACKGROUND

The present disclosure relates to a throttle body for reducing the fluid pressure, particularly for arranging, in a process fluid line of a process plant, for example of the petrochemistry, the food industry, the energy economy or the like. Throttle bodies are usually provided at a control valve, for example as a sleeve-shaped or tubular so-called valve cage directly adjacent a movable valve member for adjusting the valve throughflow or in the course of a so-called restrictor in the progress of the process fluid line upstream or downstream of the valve member.

The throttle body comprises a plurality of channels which extend from an upstream channel inlet to a downstream channel outlet. In order to pass the throttle body, the process fluid has to flow through its channels. The throttle body thus realizes a flow resistance for the process fluid in which a part of the energy of the fluid, in particular of the kinetic energy and/or the pressure energy of the fluid, is reduced such that the pressure of the process fluid downstream the throttle body is lower than upstream the throttle body.

Throttle bodies are normally used in order to protect control valves from extensive wear and tear when wear-causing process conditions are present. Such wear-causing process conditions are for example present when in a process fluid line, for example at a valve, very high local differential pressures occur. Very high local differential pressures are especially problematic during simultaneous big mass flows, as well as independent from the mass flow, usually starting at around 40 bar pressure gradient. Further, wear-causing process conditions are also present in multi-phase flows when besides a fluid phase in the process fluid also a solid and/or a gas phase are present. Depending on the characteristics of the process fluid, in particular its vapor pressure, cavitation can occur in a process fluid line, whereby wear and tear and noise is highly increased. Cavitation may also occur when already a multi-phase flow, for example in the form of a vaporous process fluid, is present. When, depending on the process, a reduction of the fluid pressure below its vapor pressure is necessary, this leads to the so-called "flashing operation" where the process fluid is transferred from a single-phase fluid condition into a two-phase condition with a fluid and gas phase, wherein besides cavitation also shock waves can occur.

The use of several restrictors upstream a control valve for protecting the control valve, in particular from cavitation, is known from the Samson-Enterprise document "Der Feind im Ventil—kritische Betriebszustände bei Stellventilen" (special print from "atp—Automatisierungstechnische Praxis", year 44, magazine 7, 2002 by Dr. Ralf Herbrich).

From WO 2011/118863 A1 a throttle body is known with which the fluid pressure in a process fluid line is reduced, wherein it is tried to keep side effects of a pressure reduction, such as cavitation and noise, low. The throttle body consists of several sleeves or cylinders interlaced or overlapped with each other, into which gap openings of different sizes being offset with respect to each other are introduced such that the process fluid has to follow a multi-bent path through the gap openings of the throttle body. The kinks in the flow path and the step-like or gradual differences in size of the cross-sections of the gaps of two consecutive sleeves cause locally high-pressure fluctuations in the throttle body and therefore inevitably cavitation, which increases wear and tear and noise in the throttle body.

From DE1650196A, a throttle body consisting of a plurality of consecutive sleeve-shaped or tubular discs with notch-like channels is known, which course in a sleeve plane is curved such that no sudden changes in the cross-section in the throttle body exist in order to prevent the existence of cavitation to the greatest extent. The pressure reduction in the throttle body is especially caused by valve friction of the fluid in the notches. In a compact throttle body, however, either a big pressure reduction at low mass flows or only a slight pressure reduction at high mass flows can be achieved.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 3 shows a helical three-dimensional spiral section of a channel for a throttle body according to an exemplary embodiment of the present disclosure;

FIG. 4 shows a channel of a throttle body according to an exemplary embodiment of the present disclosure which divides into two channel extensions in its course;

FIG. 5a shows a helically-curved channel of a throttle body according to an exemplary embodiment of the present disclosure, whose gradient decreases in the course between the channel inlet and the channel outlet;

FIG. 5b shows another helically-curved three-dimensional spiral section of a channel of a throttle body according to an exemplary embodiment of the present disclosure where the gradient decreases and the surface of the channel cross-section increases;

FIG. 6 shows a part of a channel of a throttle body according to an exemplary embodiment of the present disclosure with a helically-curved three-dimensional spiral section and an inlet section;

Figure 1A:
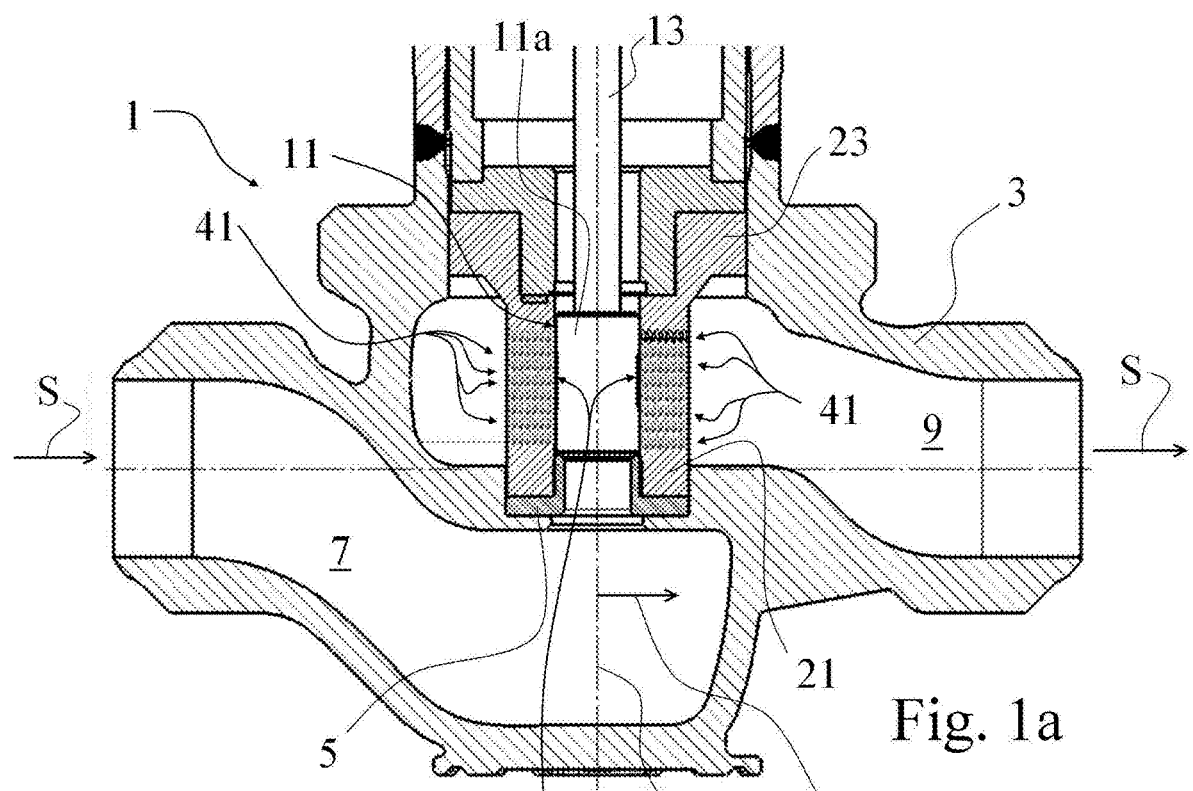
FIG. 1a shows a cross-sectional view of a valve with a throttle body in the shape of a valve cage according to an exemplary embodiment of the present disclosure.

The exemplary embodiments of the present disclosure will be described with reference to the accompanying drawings.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

It is an object of the present disclosure to overcome the disadvantages of the state of the art, particularly to improve a throttle body for reducing the fluid pressure in the process fluid line of a process plant such that while having a compact design also at high through flow volumes a high reduction of the fluid pressure can be achieved, wherein wear and tear, particularly due to cavitation, is prevented to the greatest extent.

According to the present disclosure, a throttle body for reducing the fluid pressure, in particular in a process fluid line of a process plant, for example of the petrochemistry, the food industry, the energy technology or the like, in particular for arranging in a process fluid line, is provided. The throttle body comprises a plurality of channels extending from a downstream channel inlet to an upstream channel outlet, wherein an at least section-wisely curved course of at least one of the plurality of channels between the channel inlet and the channel outlet deviates from a two-dimensional extension. It shall be clear that particularly straight channels extend only within one plane between its channel inlet and its channel outlet, wherein the plane is defined by a random second straight line being oriented perpendicular with regard to the channel course line.

Channels having a curved course in one plane are known for example from DE 1 650 196 A, previously introduced. The channels according to DE 1 650 196 A extend curvi-linearly deviating from a straight line, however, a channel inlet and a channel outlet each define a plane together with the curvature deviating from the inlet-outlet-line in which the complete course of a channel lies. In particular, a plane may be horizontally and/or perpendicularly defined with regard to a sleeve or tube middle axis of a so-called valve cage, for example it may form a disc plane according to DE 1 650 196 A. It may also be called a two-dimensional extension. Such a two-dimensional extension may particularly be present when a planar or a plane cross-section may be laid through a throttle body which completely reproduces the channel course.

An at least section-wisely curved course or extension which deviates from a planar, plane, or two-dimensional extension may also be described as a course which deviates from a straight extension in two directions in space or dimensions or as a three-dimensional course. Particularly, it shall be clear that a deviation from a planar extension, respectively a three-dimensionality of the course is not already present due to the cross-section of the channel necessarily transversely expanding with regard to the course.

In the throttle body according to the present disclosure the course may be curved such that the curvature radius of the channel course, particularly in the entire course from the channel inlet to the channel outlet which is dimensioned depending on the process fluid, in particular its viscosity, density, temperature and composition, the process conditions, in particular fluid pressure and fluid speed or velocity, and the channel cross-section, in particular its shape and dimension, such that the appearance of cavitation is essentially entirely prevented. It shall be clear that the term fluid is used for homogeneous fluids as well as for heterogeneous mixtures or compounds which may comprise a fluid and/or a gas phase, as well as potentially a solid phase. The course of the at least one channel is preferably continuous and does not comprise any steps or springs.

Preferably, the at least section-wise course of the at least one channel twists or winds along a dimension line in the throttle body around a particularly straight winding axis. A thought winding axis may preferably extend straight between the channel inlet and the channel outlet. Preferably, the winding axis is perpendicular with regard to the outer wall surface of the outer body at the corresponding channel inlet and/or channel outlet. The winding axis may, however, also comprise a curved, respectively spiral-shaped, course for increasing or lengthening the channel path from the channel inlet to the channel outlet. In particular, a radial distance between the winding axis and the dimension line is constant, however, the radial distance may also continuously increase or decrease in an axial direction wherein symmetric curved structures, for example spiral structures, such as conical, particularly with alternating increasing and decreasing conicity, or cylindrical three-dimensional spirals, may be preferred in order to anticipate a dampening behavior of the throttle body more easily. In particular, a winding curvature and/or a winding gradient relative to the axial direction may be constant, increase and/or decrease.

In a preferred embodiment of the present disclosure it is to be assured for the course of the at least one channel or the plurality of channels between the channel inlet and the channel outlet that the channel course does not comprise any inner contour jumps or springs in which a flow turbulence is caused. Rather, preferably the course of the channel which is section-wise three-dimensional spiral-shaped extends always continuous and shall be free of springs or steps in its course.

In a preferred embodiment of the present disclosure, the at least section-wise course of the at least one channel is three-dimensional spiral-shaped and/or has at least one winding completely encircling a winding axis. The three-dimensional spiral shape or at least one winding completely encircling a winding axis of the at least one channel or a plurality of channels, particularly at least ten channels, preferably at least a hundred channels, causes a clear extension of the channel path, whereby a clear increase of the throttle characteristics of the throttle body can be achieved. Preferably, the at least section-wise course follows a cylindrical three-dimensional spiral shape, such as a helical line with a constant gradient and a constant radial distance.

In a preferred embodiment of the present disclosure, the channel is straight at the channel inlet wherein the linear spiral axis essentially lies in the channel center. Directly after the channel inlet or after a straight channel inlet section, a preferably spiral curvature can start such that the spiral-shaped channel is formed around the straight spiral axis. The radial distance of the channel course to the spiral axis, or the spiral radius, can increase and particularly reach a maximum when the middle of the throttle body with respect to the flow direction is reached. At this position, the spiral radius maximum may be present. There, a gradient can continuously be continued or decreased from the spiral radius maximum such that at the channel outlet, the center of the channel again equals the straight spiral axis. Also in the channel outlet, at least the short channel section may be straight such that the process fluid leaves the channel in an essentially perpendicular direction to the outer side of the throttle body.

Preferably, the course of the at least one channel may at least at the side of the channel inlet be three-dimensional spiral-shaped with an increasing or decreasing radial distance or may be helical-shaped. In another preferred embodiment which can be combined with the previous embodiments, the course may be helical-shaped or three-dimensional spiral-shaped with a decreasing or an increasing radial distance at least at the side of the channel outlet. In particular, in a middle section of the course at least one complete winding is provided, particularly a complete helical winding with a constant gradient and/or a constant radial distance. In a middle section, also several consecutive complete windings, particularly helical windings, can be provided. With regard to a distance or path from the channel inlet to the channel outlet being as long as possible, it is advantageous to have a number of windings being as high as possible.

In a preferred embodiment of the present disclosure, a corresponding channel extends in the three-dimensional spiral section with at least a 360° winding, helically or screw-like around a helical or screw axis. In this preferred embodiment of the throttle body, the screw-like at least one winding can extend relatively to the screw axis with a constant curvature, particularly with a constant curvature radius such that all of the curvature points of the screw-like three-dimensional spiral-shaped course are lying on the screw axis. In this preferred embodiment of the present disclosure, also the gradient of the at least one screw-like winding may be constant relative to the winding or screw axis such that with regard to a constant curvature radius, at the same time a constant partition, graduation or division can be achieved, which means a constant distance between two consecutive windings. In the section-wise course, a plurality of windings can be provided, preferably at least 5, particularly 6 or 7 windings. In particular, a section-wise course comprises not more than around 100, at the most around 50, at the most around 20, or at the most around 10 windings. Particularly, a section-wise course comprises at least around 5 windings, at least around 10, at least around 20 or at least around 50 windings.

Preferably, the at least section-wise course of the at least one channel is three-dimensional spiral-shaped and comprises an area with a decreasing and/or an increasing gradient and/or a constant screw gradient. For example, the gradient of a section-wise three-dimensional spiral-shaped channel can decrease when at the same time the radial distance increases such that the division of the section, namely the distance between two adjacent windings of a channel, remains constant. Similarly, the gradient may increase for a reduced radial distance in an axial direction such that the division remains constant.

Preferably, the throttle body comprises one of the plurality of channels which comprises, in the course from the channel inlet to the channel outlet, at least in part a decreasing gradient. Conclusively, the channel course may for example essentially be perpendicular with regard to the outer surface adjacent the channel inlet. Further, when the gradient decreases, several consecutive windings of a channel may be arranged close to each other in the course of the channel such that a decreasing division is realized. Thereby, a few slightly curved windings may be arranged close to the channel inlet and in the further channel course, close to the channel outlet. In a comparable volume of the throttle body a higher number of windings having a higher curvature can be arranged. Thereby, it can be assured that the pressure loss in the process fluid is achieved mainly through wall friction in the channel. The gradient may also increase in parts. Particularly, the gradient continuously decreases or increases such that the corresponding channel may be free of gradient springs respectively kinks in its course.

In a preferred embodiment of the present disclosure, the course of the at least one channel is at least at the side of the channel inlet three-dimensional spiral-shaped with an increasing or a decreasing curvature. Alternatively, the course may, at least at the side of the channel outlet, be three-dimensional spiral-shaped with a decreasing or an increasing curvature. Particularly, in a middle section of the course at least one complete winding, particularly a complete helical winding with a constant curvature is provided. In order to prevent curvature jumps or kinks in the corresponding channel course, the channel curvature preferably continuously increases and/or decreases. In particular, at the channel inlet, the curvature can increase such that the channel extends initially straight and the straight course preferably continuously merges into the three-dimensional spiral-shaped, particularly screw-like or helically curved section. Thereby, especially at the channel inlet at which normally high flow speeds are present, the channel course may radially merge into a three-dimensional spiral section such that cavitation can be prevented to the greatest extent. Preferably, a curvature within a three-dimensional spiral-shaped section increases and/or, potentially afterwards, decreases. With such a conical three-dimensional spiral-shaped course, the winding of the channel may for example in the radial course of the sleeve or tubular body increase to the outside, namely increase with the radial distance of the sleeve axis, at a sleeve-shaped or tubular throttle body in order to utilize the volume of the throttle body to the greatest extent. Preferably, the curvature of the channel decreases at the channel outlet such that the fluid flow does not leave the channel outlet directly from a three-dimensional spiral section with a high curvature. A well-defined flow course can therefore be generated at the channel outlet.

Preferably, the course of the at least one channel at the inlet is perpendicular with regard to an outer surface of the throttle body adjacent the channel inlet. The course of the at least one channel may also or alternatively at the outlet be perpendicular with regard to an outer surface adjacent the throttle body. It shall be clear that for example for a throttle body in the form of a sleeve, such as a valve cage or a throttle piston, the perpendicular orientation of the spiral or helical or screw axis can be determined by means of the sleeve middle axis. For disc-shaped restrictors, it is assured that the flow direction at the channel inlet respectively at the channel outlet essentially equals the flow direction of the process fluid in the upstream and/or the downstream fluid area. For a sleeve-shaped or tubular throttle body an essentially radial flow direction is achieved by a perpendicular channel orientation at the channel inlet and/or the channel outlet with regard to the sleeve body.

Preferably, the at least one channel comprises a preferably circular channel cross-section which particularly may be defined perpendicular with regard to the dimension of the course. Channel cross-sections deviating from a circular shape are also possible, particularly oval or polygonal with round edges. Preferably, the surface of the channel cross-section between the channel inlet and the channel outlet may at least section-wisely particularly continuously increase and/or particularly continuously decrease. In order to prevent cross-section jumps which would cause a gradual or step-shaped channel course, wherein cavitation potentially at the step could not be prevented, the surface in the course from the channel inlet to the channel outlet preferably continuously increases and/or decreases. In particular, at the channel outlet the surface of the channel section may increase. Therefore, the volume expansion of the process fluid due to the pressure decrease at the channel course may be taken into account.

It is advantageous to increase the channel cross-section in the course of the corresponding channel such that the volume flow, particularly the fluid speed or velocity, in the course of the channel at least does not increase and/or such that the temperature of the process fluid in the corresponding channel course does not decrease. Thereby, potential material damages caused by the increased fluid speed or by a crack formation in the throttle body due to a temperature gradient of the throttle body material are prevented.

Preferably, a channel cross-section at the channel inlet may for example taper funnel-like and/or expand at the channel outlet for example funnel-like such that at the channel inlet and/or at the channel outlet a continuous flow or course of the fluid from the upstream fluid area along the throttle body outer surface into the channel, respectively out of the channel, along the throttle body outer surface to the downstream fluid area may be assured.

In a preferred embodiment of the present disclosure the at least one channel divides into at least two channel limbs. Particularly an at least section-wisely curved course of at least one of the channel limbs between a channel junction or fork and a second channel junction or fork, a channel outlet or a channel inlet may deviate from a two-dimensional extension. For the section-wisely curved course of the at least one channel limb deviating from a two-dimensional extension, the courses described with regard to the channels can be relevant. A channel may also be divided into three, four or more channel limbs. When the tube radius in a preferred junction according to the present disclosure of a channel is decreased into two or more channel extensions, a higher loss of pressure can be caused in the channel extensions due to the relatively smaller channel radius, as in a bigger channel tube. Thereby, the entire cross-section surface evolves preferably such that the sum of the cross-sections of the channel extensions, particularly at the beginning of the channel extensions, is at least as big as the cross-section of the original channel, particularly in front of the junction. In such way, the cross-section in the channel course can increase in order to make room for a fluid expansion and at the same time the wall surface can be clearly increased. The channel extensions comprise particularly each at least one own three-dimensional spiral section. Surprisingly, it was found out that an increase of the fluid velocity when decreasing the channel cross-section can be prevented by means of providing further channel extensions of a small cross-section.

In a preferred embodiment of the present disclosure, the at least one channel of the plurality of channels can divide into at least two channel extensions or channel limbs in its course between the channel inlet and the channel outlet. The channel extensions may each comprise a three-dimensional spiral-shaped course, wherein it is also possible that only one of the at least two channel extensions after the division comprises a linear straight or two-dimensional course. Preferably, the channel extensions extend parallel next to each other towards the outlet side of the throttle body, however, may also merge or be brought together into a common channel section which, again, may be three-dimensional spiral-shaped.

Preferably, the at least section-wise course of at least two channels or potentially at least two channel limbs is/are wound three-dimensional spiral-shaped with essentially the same radial distance and/or essentially the same gradient around each other and/or around a common winding axis. The winding around each other of section-wise courses of two or more channel extensions or channels is particularly advantageous for exploiting the throttle body volume when the distance of two adjacent windings of a channel is sufficiently big in order to receive a further channel. Courses wound around each other may preferably have the shape of a double or multi-helix.

In a preferred embodiment of the present disclosure, the throttle body is free of the straight channels and/or free of the channels whose course does not deviate from a two-dimensional extension. Particularly, all the channels of the throttle body are essentially congruent.

In a further preferred embodiment, the throttle body comprises at least two different materials or substances through which the at least one of the plurality of channels extends. The use of different throttle body materials allows for especially low-wear and quiet throttle bodies. In particular, the materials or substances differ from each other with regard to their respective stability, rigidity, and/or wear-resistance. In particular, at least one of the plurality of channels is made from one of the two materials and at least another of the plurality of channels is made of another of the two materials. Particularly, one channel is made of two materials.

Every channel has its own channel course with a channel centerline which extends through the middle points of the cross-sections of the channels which are arranged between the channel inlet and the channel outlet behind each other, wherein the channel inlet and the channel outlet may each define a channel cross-section. For the description of the channel course, for example in a Cartesian coordinate system, for example dimensional vectors are suitable, which are formed by two vectors in the plane of the throttle body outer surface at the channel inlet and a third dimensional vector perpendicular with regard to both first dimensional vectors. Alternatively, the channel course may also be described by means of so-called streamlines, respectively stream filaments, which follow the flow tube defined by the channel geometry, where for example Euler or Bernoulli equations may be used. The respective channel course defines the course of the fluid flow in the channel as long as the fluid fills out the respective channel.

In FIGS. 1a, 1b, 2a and 2b, preferred embodiments of throttle bodies according to the present disclosure are illustrated. In general, a valve is indicated with the reference number 1. The valve 1 comprises a valve housing 3 at which a valve seat 5 is fixedly provided, which cooperates with a valve member 11 which is controlled via a valve rod 13.

Figure 1B:
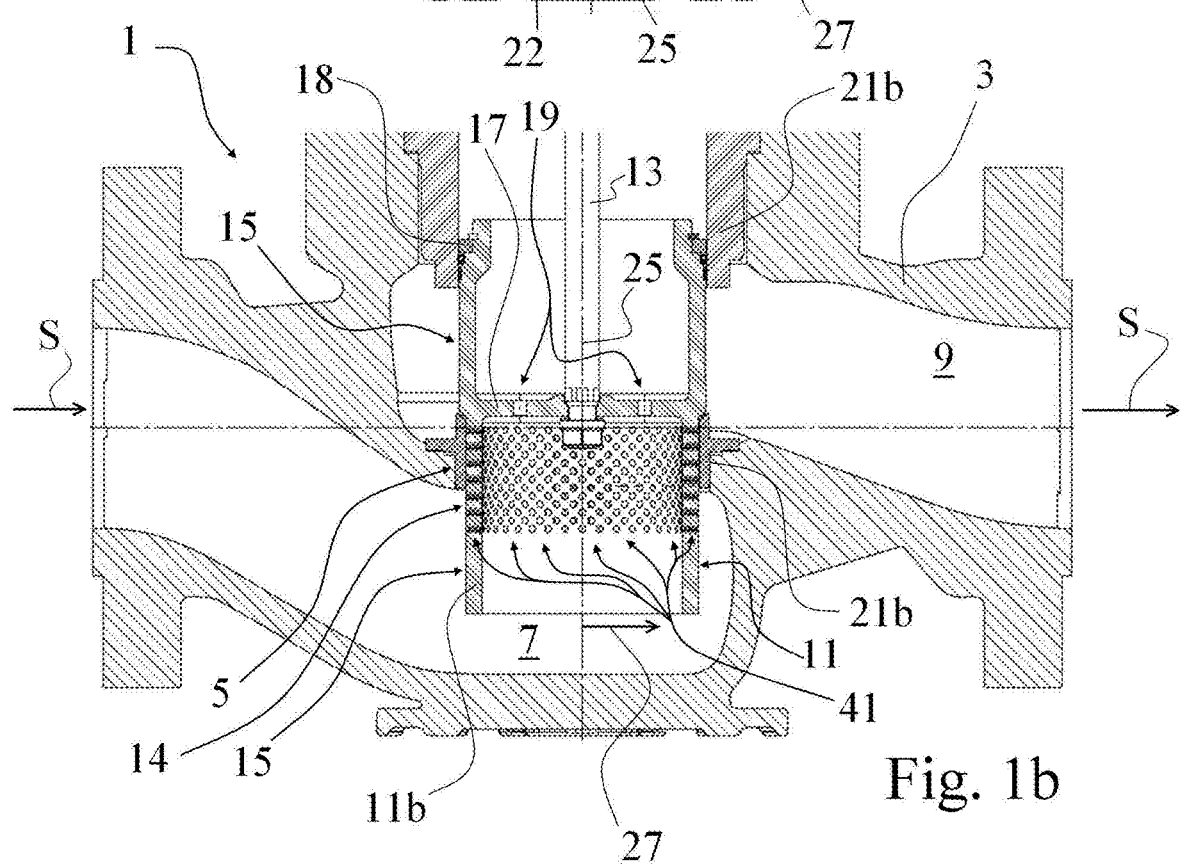
FIG. 1b shows a cross-sectional view of a valve with a throttle body in the shape of a throttle piston according to an exemplary embodiment of the present disclosure.
Figure 2A:
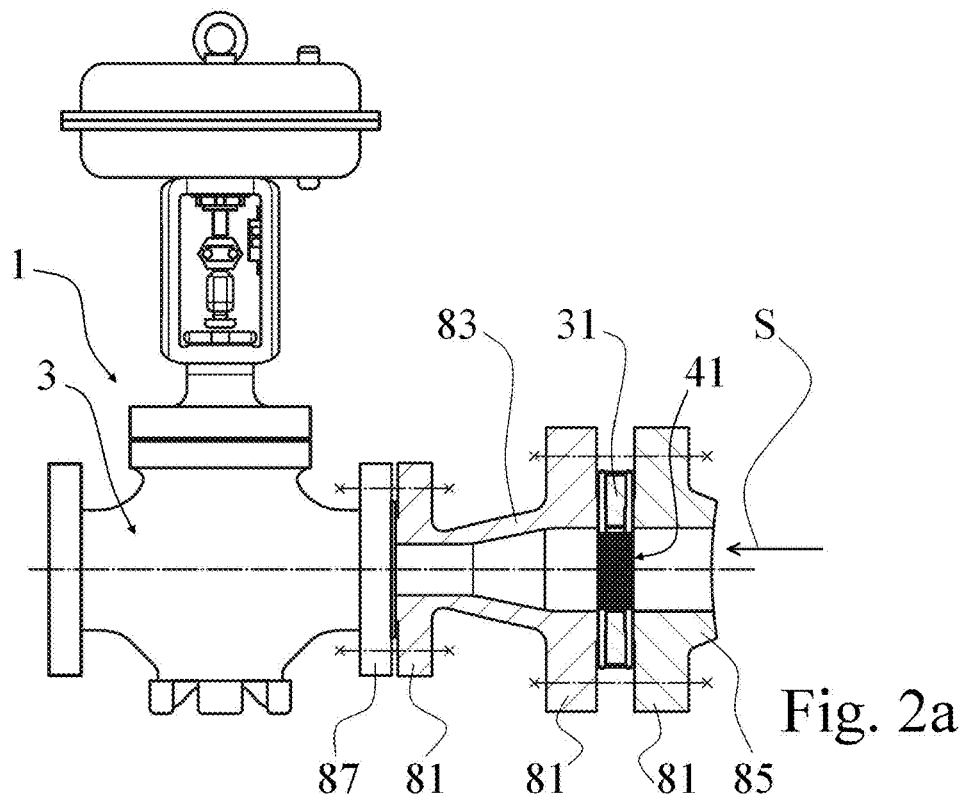
FIG. 2a shows a schematic cross-sectional view of a valve with a throttle body in the shape of a restrictor according to an exemplary embodiment of the present disclosure.

FIGS. 1a, 1b, 2a and 2b each show throttle bodies according to the present disclosure, which are realized as a valve cage 21 in FIG. 1a, a throttle piston 11b in FIG. 1b, and as a restrictor 31 in FIG. 2a, respectively 2b. The flow direction of the process fluid through the process fluid line is indicated by an arrow S. It shall be clear that the flow direction could also be directed in the reverse direction, however, in the following it is assumed that the fluid flow flows as indicated, for the purpose of simplicity. The restrictor 31, the valve cage 21, respectively the throttle body 11*b* comprises a plurality of channels 41, which extend from the upstream to the downstream outer surface of the corresponding throttle body.

Such throttle bodies according to the present disclosure may be manufactured differently, for example by means of generative manufacturing methods, such as laser sintering, 3D printing, or the like, or by means of injection methods.

In FIG. 1*a*, the valve cage 21 is essentially tubular and completely surrounds the valve member 11 which has the form of a valve piston 11*a*. The maximum outer diameter of the valve piston 11*a* is slightly smaller than the inner diameter of the tubular valve cage 21 in the area of the channels 41 such that when moving the valve piston 11*a* from its closed position in which it seals with the valve seat 5, as shown in FIG. 1*a*, the position of the valve member, namely of the valve piston 11*a*, only gradually releases the throughflow through the channels 41. Particularly, the openings of the channels 41 arranged radially internally at the valve cage 21, namely in case of the indicated flow direction S, the channel outlets, in an axial direction of the valve cage 21, are arranged offset with respect to each other such that the throughflow cross-section of the channels 41 released by the valve member 11 may be increased as constantly as possible. It shall be clear that the design of the valve, which is for example shown in FIG. 1*a* with a piston-shaped valve member 11 (valve piston 11*a*), is not of high relevance with regard to the throttle body according to the present disclosure.

The valve cage 21 is maintained at the valve housing 3 and due to its tubular shape defines a sleeve middle axis 25 which preferably corresponds to the valve member axis. For this purpose, the valve cage 21 may cooperate at a first axial end with the valve seat 5, wherein the valve seat 5 may form a sealing between the flow area in front of and behind the valve member. At the second axial end of the valve cage 21 a flange 23 projecting in a radial direction 27 may be provided in order to support the valve cage 21 with respect to the valve housing 3.

The embodiment shown in FIG. 1*b* differs from the one according to FIG. 1*a* essentially only in that the throttle body is realized by a valve member 11 in the shape of a throttle piston 11*b* and that instead of a valve cage 21 a throttle piston guide 21*b* is fixedly mounted at the valve housing 3.

In the embodiment according to FIG. 1*a*, the throttle body is fixedly arranged at the valve housing 3, whereas in the embodiment according to FIG. 1*b*, the throttle body is movably mounted with respect to the valve housing 3. In both embodiments according to FIGS. 1*a* and 1*b*, as described above, when moving the valve member 11 in an axial direction from the closed position, shown in FIG. 1*b* as well, in which it seals with the valve seat 5, the throughflow through the channels 41 is effectively released only gradually. Also, in the embodiment shown in FIG. 1*b*, the openings of the channels 41 arranged radially externally at the throttle piston 11*b*, namely the channel outlets in case of the indicated flow direction S, are arranged offset with respect to each other in an axial direction of the throttle piston 11*b*, such that the throughflow cross-section of the channels 41 released by the valve seat 5, respectively the throttle piston guide 21*b*, may be increased as constantly as possible.

It shall be clear that the channels of the throttle piston 11*b*, where the inlet and the outlet are located in the entrance area 7 of the valve 1, as shown in FIG. 1*b*, are not to be considered as effectively released, but only such channels 41 where a channel inlet is exposed in the direction of the entrance area 7 of the valve 1 and a channel outlet is exposed in the direction of the outlet area 9 of the valve 1, may be understood as effectively released (not illustrated in FIGS. 1*a* and 1*b*), because only then a flow direction S from the entrance area 7 of the valve 1 through the channels 41 of the throttle body towards the outlet area 9 of the valve 1 occurs. The throttle piston 11*b* has an actively throttling axial section 14 in which the channels 41 are arranged.

The throttle piston 11*b* forms an essentially rotationally symmetric body with regard to the sleeve axis 25 and has a U-shape, respectively an H-shape, in a radial plane cross-section. The embodiment shown in FIG. 1*b* has an H-shaped throttle piston 11*b* with axial sections 15 being passive with respect to the throttling without channels 41 which cooperates with the throttle piston guide 21*b* for axially guiding and sealing. Also, the H-shaped throttle piston 11*b* has a disc-shaped connection section 17 which forms the middle bar of the H-shape in order to connect the pipe-shaped or tubular outer wall of the throttle body with the valve rod 13. In the illustrated H-shaped embodiment of the throttle body 11*b* pressure compensation bores 17 are provided in the disc section 16, which allow for a movement of the throttle piston 11*b* in its axial direction, essentially without a pressure gradient. In this way, only an especially low actuating force of the actuator (not shown) for moving the throttle piston 11*b*, namely for opening and/or closing the valve 1, is necessary. In an alternative embodiment of the throttle piston 11*b* having a U-shape (not shown), no upper sleeve section 15, being passive with respect to the throttling, and therefore necessarily also no pressure compensation force 17 in the disc section 16 would be foreseen, because then the disc section 16 would have to form a fluid-tight barrier between the inlet section 7 and the outlet section 9 of the valve in a closed valve condition.

In order to realize a good sealing effect at the surfaces of the valve member 11 and the valve housing 3, being movable with respect to each other, seals may be provided at the valve member 11 and/or the surfaces of the valve housing 3, cooperating with the valve member 11. As shown in FIG. 1*b*, for example at the upper section 15 of the throttle piston 11*b*, being passive with respect to the throttling, a sealing ring 18 may be marked which is in contact with the upper throttle piston guide 21*b*.

Figure 2B:
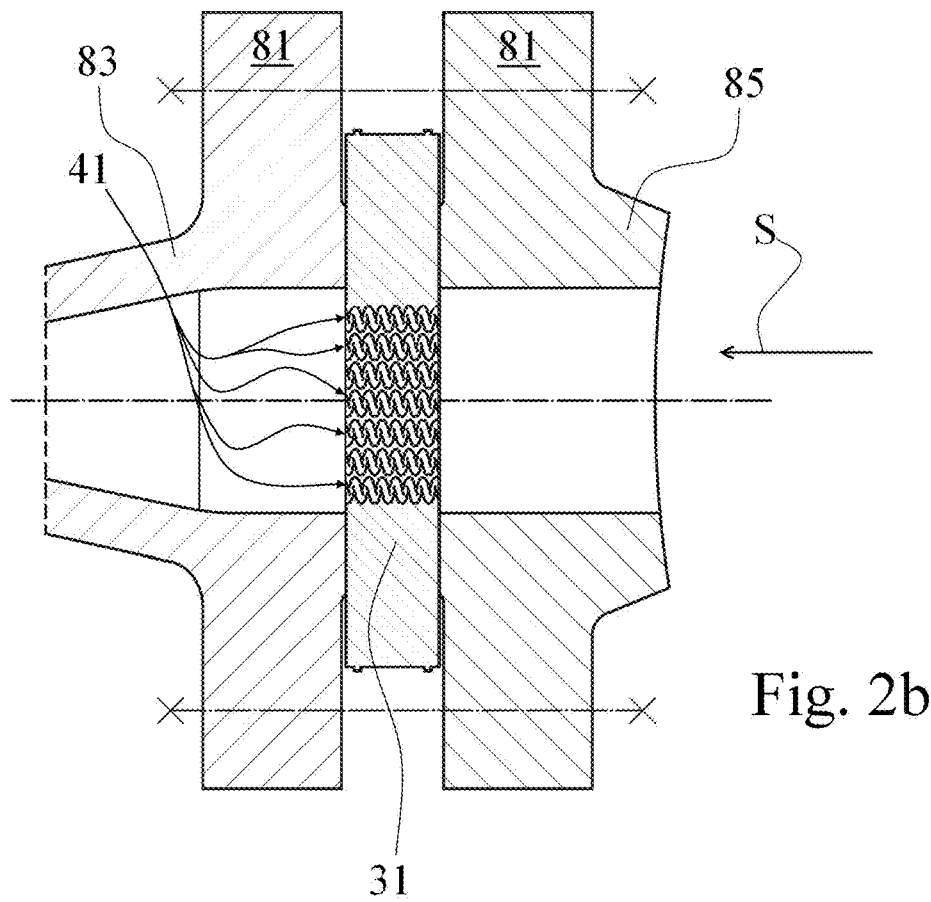
FIG. 2b shows a schematic cross-sectional view of the restrictor according to FIG. 2a in detail.

FIG. 2*a* shows a control device with a control valve 1 whose valve housing 3 is not shown in a cross-sectional view in FIG. 2*a*, and with a throttle body in the shape of a restrictor 31 upstream the valve 1 in the flow direction S. The flow direction can alternatively be directed in the reverse direction, as with regard to the previous FIGS. 1*a* and 1*b*, and therefore the restrictor 31 may be arranged downstream with regard to a valve 3 in a flow direction (not shown). A restrictor 31 upstream the valve 1 is advantageous in so far as a pressure reduction in the process fluid in an open valve position occurs already in front of the valve 1 such that in particular, when closing the valve, the pressure fluctuations occurring therein may be held low. As shown in FIG. 2*b* in detail, a restrictor 31 may be formed by a disc-shaped or block-shaped material, which section-wisely comprises channels 41. A restrictor 31 may, for example, be arranged and maintained between two tube flanges 81 of tubes 83, 85 for guiding the process fluid.

It shall be clear that the illustrations in FIGS. 2a and 2b are only of a schematic nature and between the restrictor 31 and the tube flange ends 81, adjacent the indicated connection screws, for example sealing discs and/or centering means (not shown) may be provided in order to ensure an accurately fitting sealing seat of the restrictor 31 between the tube flange ends 81. Further, it shall be clear that a restrictor may alternatively be arranged between a flange 87 of the valve housing 3 and a tube end flange 81 connected therewith (not shown).

As shown in FIGS. 2a and 2b, a tapering tube 83 may be arranged behind the restrictor 31 in the flow direction S. The tapering cross-section of the tube 83 may be configured to adapt the flow velocity of the process fluid.

Preferably, the channels 41 of a throttle body are congruent, as shown in FIGS. 1a, 1b, 2a and 2b. A throttle body may also comprise channels having a different shape, for example in a valve cage 21, the channels 41, which are already released in a slightly opened position of the valve member 11, have a smaller channel cross-section than channels 41 released later. A throttle body according to the present disclosure may also have channels without a three-dimensional spiral section (not shown). In an especially preferred embodiment, however, all of the channels of a throttle body according to the present disclosure comprise each at least one three-dimensional spiral section.

As shown in FIGS. 1a, 1b, 2a and 2b, a channel may comprise exactly one three-dimensional spiral section which interruption-freely extends from the channel inlet 43 until the channel outlet 45. Such a channel 41 is shown in detail in FIG. 3. The channel 41 according to FIG. 3 has in its helically-wound course, from the channel inlet 43 to the channel outlet 45, seven windings, which means that the fluid, while flowing through the channel 41 from the channel inlet 43 to the channel outlet 45, performs seven rotations around the screw axis A of the channel 41. The gradient of the channel 41 shown in FIG. 3 is constant. This may be identified because of the fact that the distances $D_1$, $D_2$, $D_3$, $D_4$, $D_5$ and $D_6$ of two adjacent windings are all of the same size, while the curvature of the channel course remains constant. Due to the constant curvature of the channel 41 in FIG. 3, the curvature middle points of the channel course correspond to the screw axis A.

In the preferred embodiment of a throttle body according to FIG. 1 with channels according to FIG. 3, the screw axis A is straight and extends essentially radially with regard to the symmetry axis 25 of the tubular valve cage 21 and may, as shown, lie essentially in one plane perpendicular to the axis of the valve cage 21. With regard to a surface perpendicular to the axis of the valve cage 21, the screw axis A of a channel 41 may, however, also be angled such that a path or path distance of the channel through the throttle body in comparison to a non-angled orientation of the screw axis A is increased or lengthened. The cross-section of a channel may preferably be circular.

FIG. 4 shows a preferable embodiment of a channel 141 which at first comprises a three-dimensional spiral section 51 in the flow course and subsequently divides into two channel extensions 61, 63. The channel 141 shown in FIG. 4 comprises a right-hand three-dimensional spiral section 51. In one of the channel extensions 63, the right-hand winding may continue in a three-dimensional spiral section 53 of the channel extension 63 right-handedly, and in another three-dimensional spiral section 55 of the other channel extension 61 left-handedly. In this way, the junction 65 of the channel 141 may be configured especially advantageously with regard to the prevention of cavitation in the channel 141. As may be seen in FIG. 4, the cross-sections of the channel extensions 51, 53 are of essentially the same size and smaller than the cross-section of the channel 141 in front of the junction 65. Preferably, the sum of the cross-sections of the channel extensions 61 and 63 behind the junction 65 may correspond to the cross-section of the channel 141 in front of the junction 65. In particular, the surface of the cross-sections of the channel extensions 61 and 63 is at least as big as the cross-section of the channel 141 in front of the junction 65. In a preferred alternative, the sum of the cross-sections of the channel extensions 61 and 63 behind the junction 65 is bigger than the cross-section of the channel 141 in front of the junction 65 and/or increases after the junction 65, particularly with a constant increase per winding rate. Similar to the channel 41 shown in FIG. 3, the channel 141 in front of the junction 65 is spiral or helical with a constant curvature and a constant gradient around a screw axis A. Also, the three-dimensional spiral sections 53, respectively 55 of the channel extensions 63, respectively 61, are helical and twistedly extend around a corresponding screw axis A", respectively A'. The screw axis A" of a channel extension may be parallel to the screw axis A of the channel 141 in front of the junction 65, the screw axis A' of a channel extension may also be oriented transversely to the screw axis A of the channel 141 in front of the junction 65. Throttle bodies according to the present disclosure with channels 141 which divide into at least two channel extensions 61, 63 are particularly suitable for tubular valve cages 21 or throttle pistons 11b, where the flow direction is oriented according to the flow direction S shown in FIG. 1a or 1b, namely from the inside to the outside, in a radial direction 27 through the valve cage 21, respectively the valve piston 11b, because the volume of the throttle body in the radial direction increases such that there is enough space for a division of the channels 141.

In FIGS. 5a and 5b, the three-dimensional spiral sections 51 of channels 241, 341 are shown, whose gradient decreases in the channel course which may be identified due to the fact that the distance, for example $D_1^*$, $D_2^*$, $D_3^*$ and $D_4^*$, of two consecutive windings decreases. The cross-section and the distance of the channel 241 with regard to the spiral axis A in the three-dimensional spiral section 51 is constant in the shown course of the channel 241.

The three-dimensional spiral section 51 of the channel 341 shown in FIG. 5b differs from the three-dimensional spiral section 51 of the channel 341 in that the cross-section of the channel 241 increases in its course. The cross-section of the channel 341 increases to the greatest extent continuously. In the course of the channel 341 from the channel inlet to the channel outlet, its cross-section may also change in places, respectively in parts, abruptly such that the channel comprises a step 71. In particular, steps 71 depending on the upstream channel cross-section, the fluid characteristics, the fluid velocity and the fluid pressure are dimensioned such that the pressure change at the step 71 does not cause cavitation. Preferably, a channel with a cross-section which changes in the course of the channel, is however free of steps, inner contour springs, kinks or the like.

An especially preferred embodiment of a channel 441 of a throttle body according to the present disclosure is shown in FIG. 6, where the channel course is essentially perpendicular at the channel inlet with regard to the adjacent throttle body outer surface 47. In the further course of the channel 441, the curvature increases along a channel inlet section 443 towards the three-dimensional spiral section 51. In the three-dimensional spiral section 51 of the channel 441, the channel again extends helically around a screw axis A. The channel outlet of the channel 441 is not shown, however, it shall be clear that the course of the channel 441 may comprise at its channel outlet at first a section-wisely decreasing curvature out of the three-dimensional spiral section 51 to the channel outlet, such that the channel course at the channel outlet may again be perpendicular with regard to the corresponding adjacent throttle body outer surface.

Figure 7:
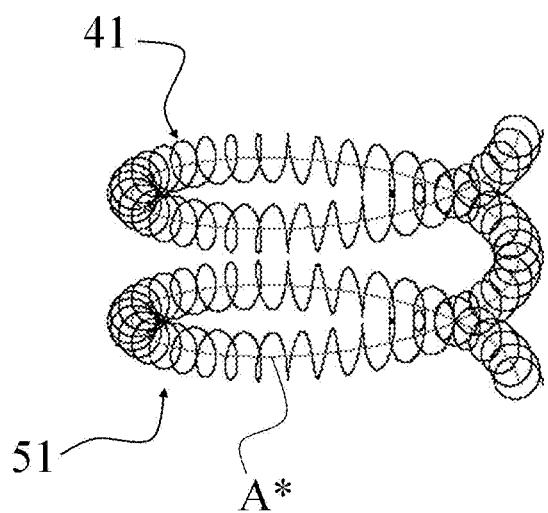
FIG. 7 shows a helically-curved three-dimensional spiral section of a channel of a throttle body according to an exemplary embodiment of the present disclosure where the spiral axis is also helically-curved.

FIG. 7 shows a three-dimensional spiral section of an especially preferred embodiment of a channel of a throttle body according to the present disclosure. In this preferred embodiment, the channel extends in a three-dimensional spiral section helically around a spiral axis A*, wherein the spiral axis itself does not extend straight but curved, preferably also screw-like or helically. A throttle body with such channels may generate via a single throttle stage, namely with only one throttle body, a very big pressure reduction only because of valve friction in the channel because a three-dimensional spiral-shaped channel, which is wound around a spiral or screw axis, which itself does not follow a straight but a three-dimensionally curved and preferably even wound path, allows to reach a channel length which is significantly bigger than the wall thickness of the throttle body.

Figure 8:
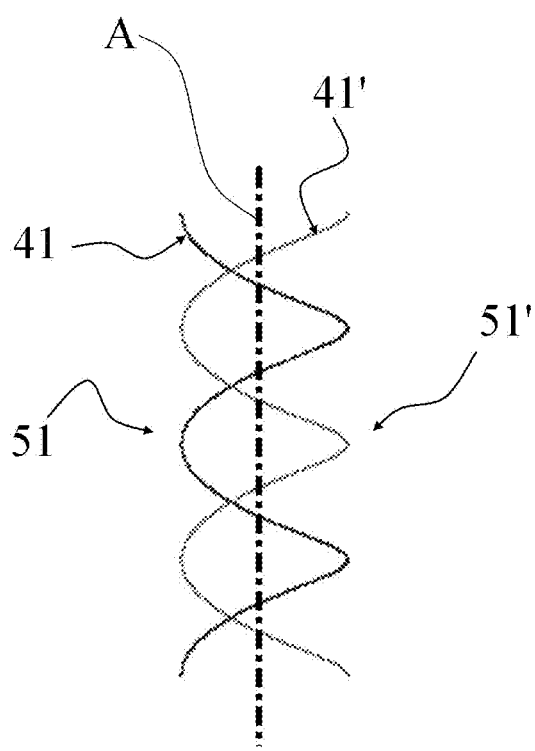
FIG. 8 shows two three-dimensional spiral sections, wound around each other, of channels of a throttle body according to an exemplary embodiment of the present disclosure.

In FIG. 8 the three-dimensional spiral sections 51 and 51' are wound around each other and preferably around a common spiral axis. The winding of two three-dimensional spiral sections 51 and 51' around each other may be advantageous if three-dimensional spiral sections are provided with a gradient which is big enough so that between two consecutive windings of a channel, there is enough space to introduce a further channel into the throttle body. Similar to three-dimensional spiral sections 51, 51' of two channels 41, 41', also channel extensions 61 or 63 may be wound around each other, wherein the wound three-dimensional spiral sections of course have the same orientation, namely both right-handed and both left-handed. In particular, also three, four or more three-dimensional spiral sections may be wound around each other (not shown).

The features disclosed in the preceding description, the figures and the claims may be relevant alone as well as in any combination for the realization of the present disclosure in the different embodiments.

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST 1 valve
3 valve housing
5 valve seat
7 inlet section
9 outlet section
11 valve member
11a valve piston
11b throttle piston
13 valve rod
14 throttling section
15 passive section
16 disc section
17 pressure compensation bore
18 sealing ring
21 valve cage
21b throttle piston guide
23 flange
25 sleeve middle axis
27 radial direction
31 restrictor
41, 141, 241, 341, 441 channel
43, 443 channel inlet
45 channel outlet
47 throttle body outer surface
51 three-dimensional spiral section
61, 63 channel extension
65 junction
71 step
81 tube end flange
83, 85 tube
87 valve housing flange
S flow direction
A screw axis

The invention claimed is:

1. A throttle body for reducing the fluid pressure in a process fluid line, the throttle body being in a shape of a valve cage or a throttle piston, the throttle body comprising:
   an upstream channel inlet and a downstream channel outlet; and
   a plurality of channels extending from the upstream channel inlet to the downstream channel outlet, wherein:
   a curved course section of at least one of the plurality of channels deviates from a two-dimensional extension between the upstream channel inlet and the downstream channel outlet, the curved course section being continuous and free of inner contour springs, steps, or kinks,
   the curved course section of the at least one of the plurality of channels is, at least at the channel inlet, three-dimensionally spiral-shaped with an increasing or decreasing curvature,
   the curved course section of the at least one of the plurality of channels is, at least at the channel outlet, three-dimensionally spiral-shaped with a decreasing or an increasing curvature, and in a middle section of the curved course section, the curved course section includes at least one complete helical winding with a constant curvature.

2. The throttle body according to claim 1, wherein the curved course section of the at least one of the plurality of channels winds along a dimension line in the throttle body around a particularly straight winding axis, a radial distance between the winding axis and the dimension line being constant, continuously increasing in an axial direction, or decreasing in the axial direction.

3. The throttle body according to claim 2, wherein the at least one of the plurality of channels comprises a circular channel cross-section that is perpendicular to a dimension line of the curved course section, and wherein an area of the circular channel cross-section between the channel inlet and the channel outlet continuously increases or continuously decreases.

4. The throttle body according to claim 2, wherein a winding curvature and/or a winding gradient relative to the axial direction is constant, increases, or decreases.

5. The throttle body according to claim 1, wherein the curved course section of the at least one of the plurality of channels:

is three-dimensionally spiral-shaped; and comprises at least one complete circumferential winding around a winding axis, the at least section-wisely curved course following a cylindrical three-dimensional spiral shape.

6. The throttle body according to claim 5, wherein the cylindrical three-dimensional spiral shape comprises a helical curve having a constant gradient and a constant radial distance.

7. The throttle body according to claim 1, wherein the curved course section of the at least one of the plurality of channels is:

at the channel inlet, straight, three-dimensionally spiral-shaped with an increasing or decreasing radial distance, or helical-shaped, at the channel outlet, helical-shaped, three-dimensionally spiral-shaped with a decreasing or an increasing radial distance, or straight, and in a middle section of the curved course section, the curved course section includes at least one complete helical winding with a constant gradient or a constant radial distance.

8. The throttle body according to claim 1, wherein the curved course section of the at least one of the plurality of channels is three-dimensional spiral-shaped and comprises an area of a decreasing gradient, increasing gradient, or a constant screw gradient.

9. The throttle body according to claim 1, wherein the curved course section of the at least one of the plurality channels, at the channel inlet or channel outlet, is perpendicular to an outer surface of the throttle body adjacent the channel inlet or the channel outlet, respectively.

10. The throttle body according to claim 1, wherein the at least one of the plurality of channels is configured to divide into at least two channel limbs, an curved course section of one or more of the at least two channel limbs, between a channel fork and a second channel fork, a channel outlet or a channel inlet, deviating from a two-dimensional extension.

11. The throttle body according to claim 1, wherein respective curved courses of the plurality of channels or at least two channel limbs of at least one of the plurality of channels are wound three-dimensionally spiral-shaped with a same radial distance or a same gradient around each other or around a common winding axis.

12. The throttle body according to claim 1, wherein:

the throttle body is free of straight channels or channels which course fails to deviate from a two-dimensional extension; or all of the plurality of channels of the throttle body are congruent.

13. The throttle body according to claim 1, wherein the throttle body further comprises:

at least two materials having different respective stabilities, rigidities, or wear-resistances, wherein at least one of the plurality of channels is made from one of the two materials and another of the plurality of channels is made from another of the two materials, or at least one of the plurality of channels is made of the two materials.

14. The throttle body according to claim 1, wherein the throttle body is formed from a generative manufacturing process including laser sintering or three-dimensional printing, or is formed by one or more injection processes.

15. A throttle body for reducing the fluid pressure in a process fluid line, the throttle body comprising:

an upstream channel inlet and a downstream channel outlet; and a plurality of channels extending from the upstream channel inlet to the downstream channel outlet, the at least one of the plurality of channels being configured to divide into at least two channel limbs, a curved course section of one or more of the at least two channel limbs, between a channel fork and a second channel fork, a channel outlet or a channel inlet, deviating from a two-dimensional extension, wherein the curved course section of at least one of the plurality of channels deviates from a two-dimensional extension between the upstream channel inlet and the downstream channel outlet.

* * * * *